United States Patent [19]

Sepso et al.

[11] Patent Number: 4,784,177
[45] Date of Patent: Nov. 15, 1988

[54] EXPANSION DEVICE FOR A REFRIGERATION SYSTEM, PISTON THEREFOR AND METHODS OF MAKING THE SAME

[75] Inventors: Roger P. Sepso, Stratford; John M. Halmose, Bridgeport, both of Conn.

[73] Assignee: Robertshaw Controls Company, Richmond, Va.

[21] Appl. No.: 96,979

[22] Filed: Sep. 14, 1987

[51] Int. Cl.$^4$ .............................................. F16K 15/02
[52] U.S. Cl. .................................. 137/513.3; 137/528; 137/533.17
[58] Field of Search ................ 137/513.3, 528, 533.17, 137/540, 543.21

[56] References Cited

U.S. PATENT DOCUMENTS

| | | | |
|---|---|---|---|
| 1,443,675 | 1/1923 | Bowler | 137/540 |
| 2,670,922 | 3/1954 | Carlisle | 137/540 |
| 3,457,949 | 7/1969 | Coulter | 137/543.21 |
| 3,805,825 | 4/1974 | Lovingham | 137/512 |
| 3,992,898 | 11/1976 | Duell et al. | 62/324 |
| 4,009,592 | 3/1977 | Boerger | 137/513.3 |
| 4,431,117 | 2/1984 | Genbauffe et al. | 222/3 |
| 4,531,624 | 7/1985 | Ideta | 137/513.3 X |
| 4,643,222 | 2/1987 | Wiser | 137/528 |

Primary Examiner—Robert G. Nilson
Attorney, Agent, or Firm—Candor, Candor & Tassone

[57] ABSTRACT

An expansion device for a refrigeration system, piston therefor and methods of making the same are provided, the expansion device comprising a housing having opposed ports for coupling the device in the system and being separated from each other by an internal valve seat of the housing, and a movable piston disposed in the housing and having a first end surface adapted to engage against the valve seat to tend to close the same when the piston is disposed in a first position thereof in the housing, the housing having an annular shoulder, the piston having a second end surface for engaging against the shoulder when the piston is disposed in a second position thereof in the housing, the piston having a passage passing therethrough and through the end surfaces thereof for interconnecting the opposed ports together in a restricted manner when the piston is in the first position thereof, the piston having an outer peripheral surface interconnecting the end surfaces together and being provided with a plurality of grooves therein for interconnecting the opposed ports together in a substantially nonrestricted manner when the piston is in the second position thereof, the piston comprising a one-piece member of polymeric material, the first end surface of the piston comprising a substantially hemispherical section that is the part thereof that is adapted to engage against the valve seat when the piston is in the first position thereof.

4 Claims, 3 Drawing Sheets

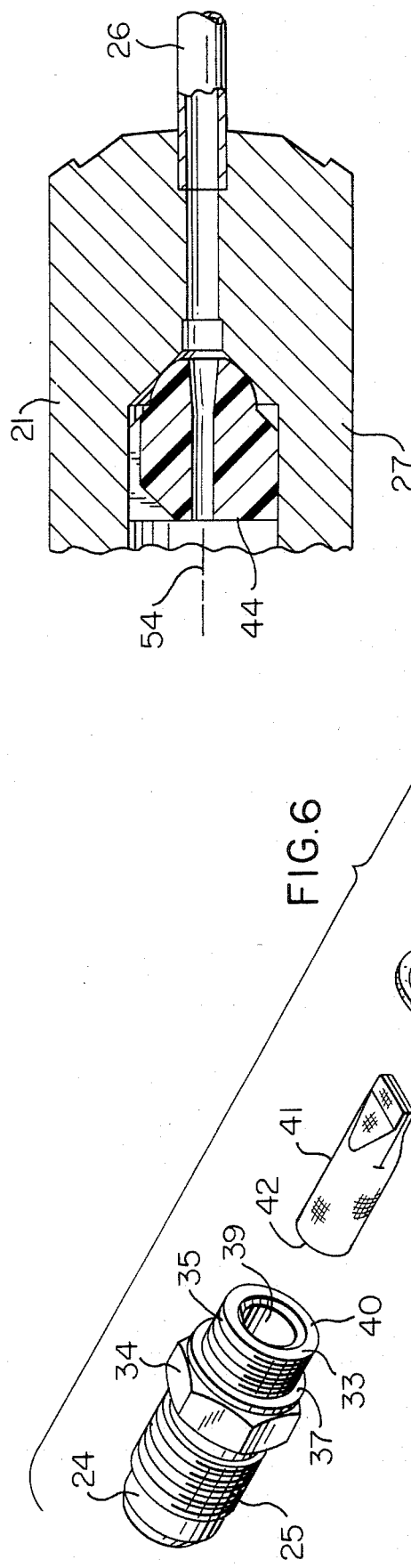
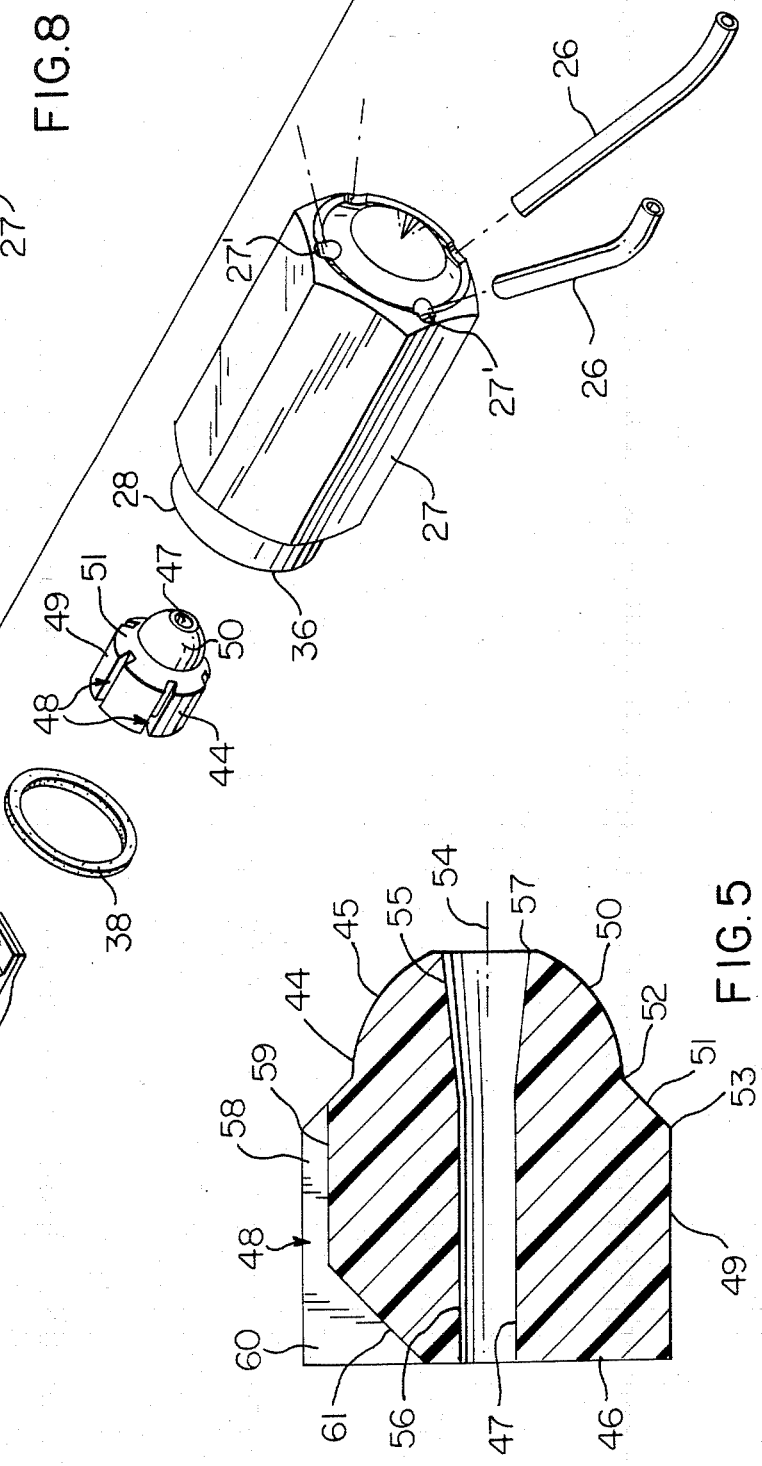

EXPANSION DEVICE FOR A REFRIGERATION SYSTEM, PISTON THEREFOR AND METHODS OF MAKING THE SAME

BACKGROUND OF THE INVENTION

1. Field of the Invention

This invention relates to a new expansion device for a refrigeration system and to a new piston for such an expansion device as well as to new methods of making such an expansion device and such a piston.

2. Prior Art Statement

It is known to provide an expansion device for a refrigeration system and comprising a housing means having opposed port means for coupling the device in the system and being separated from each other by an internal valve seat means of the housing means, and a movable piston disposed in the housing means and having a first end surface means adapted to engage against the valve seat means to tend to close the same when the piston is disposed in a first position thereof in the housing means, the housing means having an annular shoulder means, the piston having a second end surface means for engaging against the shoulder means when the piston is disposed in a second position thereof in the housing means, the piston having a passage means passing therethrough and through the end surface means thereof for interconnecting the opposed port means together in a restricted manner when the piston is in the first position thereof, the piston having an outer peripheral surface means interconnecting the end surface means together and being provided with a plurality of grooves therein for interconnecting the opposed port means together in a substantially nonrestricted manner when the piston is in the second position thereof. For example, see the U.S. Pat. No. 3,992,898 to Duell et al.

Also, see the U.S. Pat. No. 3,805,825, to Lovingham, wherein it appears that the movable piston check valve means thereof comprises a one-piece member formed of polymeric material.

Also see the U.S. Pat. No. 4,431,117 to Genbauffe et al, wherein a hermispherical end is disposed in a self-aligning manner into a frusto-concial seat.

SUMMARY OF THE INVENTION

It is one feature of this invention to provide a new expansion device for a refrigeration system and wherein a tendency for the movable piston thereof to chatter is substantially reduced.

In particular, it was found according to the teachings of this invention that the movable piston of an expansion device of a refrigeration system tends to chatter or vibrate during the fluid flow therethrough.

However, it was found according to the teachings of this invention that such a tendency to chatter or vibrate is substantially reduced if the piston comprises a one-piece member of polymeric material and the end surface thereof that is adapted to engage the valve seat means of the housing means comprises a substantially hemispherical section.

For example, one embodiment of this invention provides an expansion device for a refrigeration system and comprising a housing means having opposed port means for coupling the device in the system and being separated from each other by an internal valve seat means of the housing means, and a movable piston disposed in the housing means and having a first end surface means adapted to engage against the valve seat means to tend to close the same when the piston is disposed in a first position thereof in the housing means, the housing means having an annular shoulder means, the piston having a second end surface means for engaging against the shoulder means when the piston is disposed in a second position thereof in the housing means, the piston having a passage means passing therethrough and through the end surface means thereof for interconnecting the opposed port means together in a restricted manner when the piston is in the first position thereof, the piston having an outer peripheral surface means interconnecting the end surface means together and being provided with a plurality of grooves therein for interconnecting the opposed port means together in a substantially nonrestricted manner when the piston is in the second position thereof, the piston comprising a one-piece member of polymeric material, the first end surface means of the piston comprising a substantially hemispherical section that is the part thereof that is adapted to engage the valve seat means when the piston is in the first position thereof.

Accordingly, it is an object of this invention to provide a new expansion device for a refrigeration system, the expansion device of this invention having one or more of the novel features of this invention as set forth above or hereinafter shown or described.

Another object of this invention is to provide a new method for making such an expansion device, the method of this invention having one or more of the novel features of this invention as set forth above or hereinafter shown or described.

Another object of this invention is to provide a new piston for an expansion device for a refrigeration system, the new piston of this invention having one or more of the novel features of this invention as set forth above or hereinafter shown or described.

Another object of this invention is to provide a new method for making such a piston, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 5 is an enlarged longitudinal cross-sectional view of the new piston of this invention that is used in the expansion device of FIGS. 1-4.

FIG. 6 is an exploded perspective view of the various parts of the expansion device of FIGS. 1-5.

FIG. 8 is a fragmentary cross-sectional view taken on line 7—7 of FIG. 7.

DESCRIPTION OF THE PREFERRED EMBODIMENTS

While the various features of this invention are hereinafter illustrated and described as being particularly adapted to provide an expansion device for a refrigeration system, it is to be understood that the various features of this invention can be utilized singly or in various combinations thereof to provide a device for other types of apparatus as desired.

Therefore, this invention is not to be limited to only the embodiments illustrated in the drwaings, because the drawings are merely utilized to illustrate one of the wide variety of uses of this invention.

Figure 1:
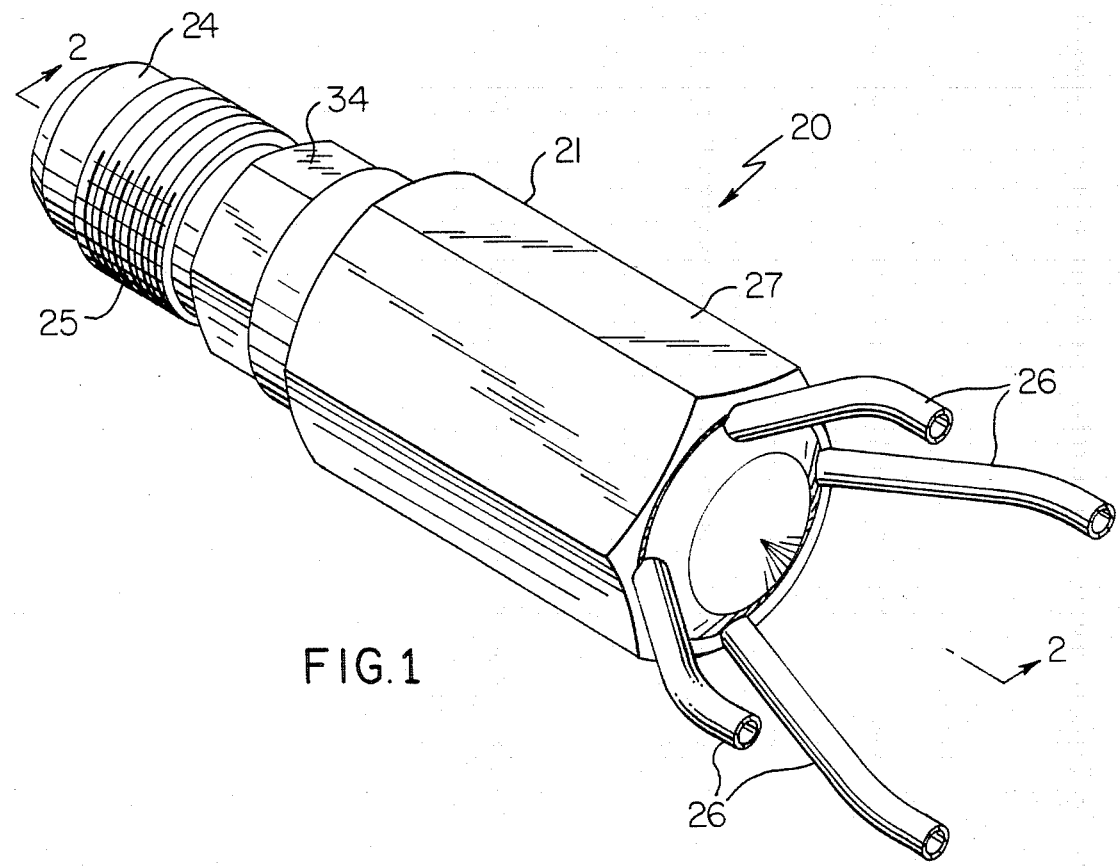
FIG. 1 is a perspective view of the new expansion device of this invention.
Figure 2:
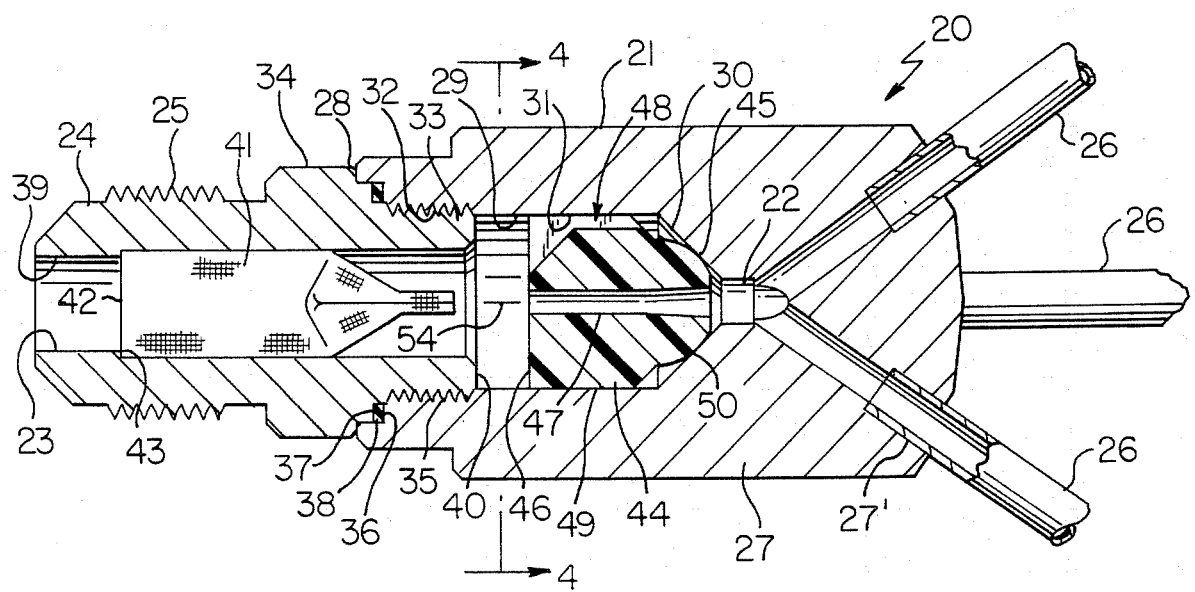
FIG. 2 is a cross-sectional view taken on line 2—2 of FIG. 1, FIG. 2 illustrating the piston of the expansion device in one operating position thereof.

Referring now to FIGS. 1-6, the new expansion device of this invention is generally indicated by the reference numeral 20 and comprises a housing means 21 having opposed port means 22 and 23 for coupling the device 20 in a refrigeration system (not shown), such as by having the port means 23 at the end 24 of the housing 20 means 21 coupled to a conduit means (not shown) that is threadedly interconnected to external threads 25 thereof while the port means 22 is adapted to be interconnected to one or more capillary tubes 26 of the system that are secured in respective passages 27' of the housing means 21 that lead to the port means 22 in the manner illustrated in FIG. 2.

The housing means 21 of the expansion device 20 comprises a first housing member 27 having an end 28 that leads to an opening means 29 therein that interconnects with the port means 22 by an internal annular frusto-conical valve seat means 30 as illustrated, the opening means 29 defining a substantially smooth cylindrical internal peripheral surface 31 that has a substantially circular cross-sectional configuration throughout the length thereof and extending from the open end 28 to the valve seat means 30 as illustrated. The opening means 29 is internally threaded at 32 to be threadedly interconnected to a threaded end 33 of another housing member 34 of the housing means 21. The housing member 34 has the end 33 externally threaded by threads 35 which threadedly interconnect with the internal threads 32 of the housing member 27 while cooperating shoulder means 36 and 37 of the housing members 27 and 34 interconnect in abutting relation as illustrated and sandwich a sealing gasket means 38 therebetween.

In this manner, a passage 39 of the housing member 34 that extends between the ends 24 and 33 thereof is disposed in aligned and in fluid communication with the opening means 29 in the member 21 with the end 33 of the housing member 34 cooperating with the housing member 27 to define an annular shoulder means 40 for a purpose hereinafter described.

A suitable screen-like filter means 41 is disposed in the opening 39 of the housing member 34 and has an end 42 that abuts against an internal shoulder 43 of the housing member 34 whereby the shoulder 43 holds the filter means 41 therein as illustrated.

Figures 3, 4, 7:
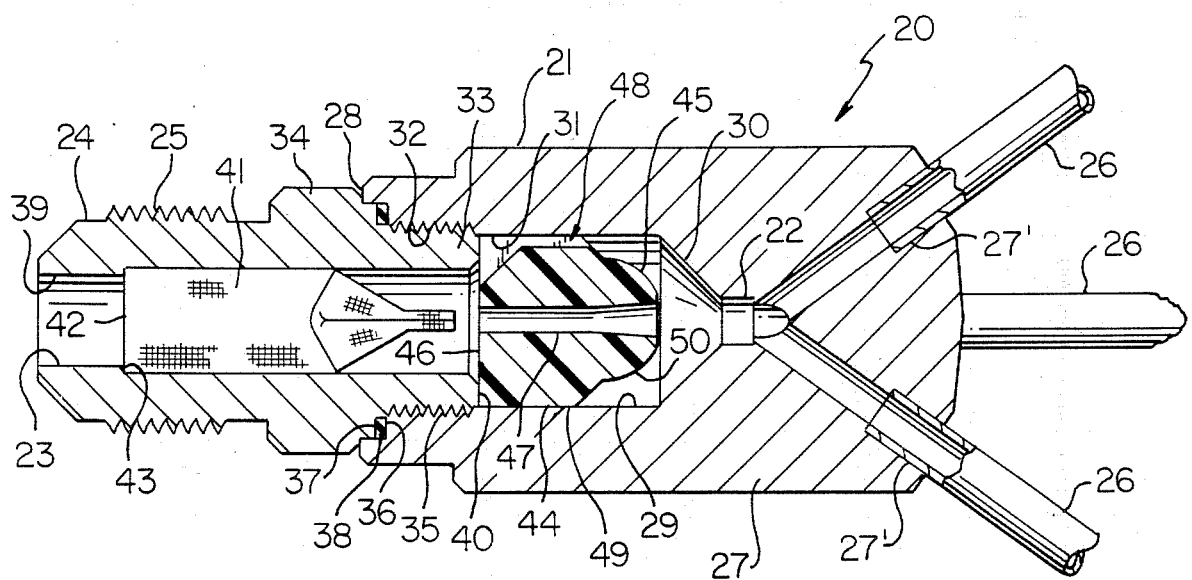
FIG. 3 is a view similar to FIG. 2 and illustrates the piston of the expansion device in another operating position thereof.
FIG. 4 is a cross-sectional view taken on line 4—4 of FIG. 2.
FIG. 7 is a fragmentary view similar to FIG. 1 and illustrates another expansion device of this invention.

The expansion device 20 has a movable piston 44 disposed therein that is movable from a first position thereof wherein a first end surface means 45 thereof is adapted to engage against the valve seat means 30 as illustrated in FIG. 2 to another or second position thereof wherein a second end surface means 46 thereof is adapted to engage against the shoulder means 40 as illustrated in FIG. 3, the piston 44 having a passage means 47 formed centrally therethrough and interrupting the end surface means 45 and 46 thereof so as to provide a restricted flow path between the ports 23 and 22 when the piston, 44 is disposed in the first position thereof as illustrated in FIG. 2. The piston 44 is adapted to provide a substantially nonrestricted flow path between the ports 23 and 22 when the piston 44 is disposed in the second position as illustrated in FIG. 3 because a plurality of grooves 48 are formed in an outer peripheral surface means 49 thereof that interconnect the first end surface means 45 to the second end surface means 46 in a manner hereinafter set forth.

Since the operation and use of an expansion device in a refrigeration system is well known in the art, such as set forth in the aformentioned U.S. patent to Duell et al, U.S. Pat. No. 3,992,898 whereby this patent is being incorporated into this disclosure by this reference thereto, further details of the operation of the expansion device 20 in a refrigeration system will not be set forth.

The piston 44 of this invention comprises a one-piece member made of a suitable polymeric material, such as a high temperature thermoplastic that has an inherent low coefficient of friction and is sold under the trademark or trade name "VECTRA" by the Cellanesse Corporation.

The piston 44 of this invention can be formed of such a polymeric material by a molding operation, if desired, or can be machined from a block thereof, if desired.

In any event, it can be seen that the piston 44 of this invention has the first end surface means 45 thereof formed with a central section 50 that defines a substantially hemispherical configuration so that the section 50 is adapted to self-align or self-seat on the frusto-conical valve seat means 45 to seal closed the same when the piston 44 is in the first position thereof as illustrated in FIG. 2.

The first end surface means 45 of the piston 44 also includes an outer annular section 51 that defines a substantially frusto-conical configuration that has the smaller base 52 thereof interconnecting with the hemispherical section 50 and the larger base 53 thereof interconnecting with the outer peripheral surface means 49 as illustrated.

The second end surface means 46 of the piston 44 is substantially flat and is disposed transverse to the longitudinal axis of the piston 44, the axis of the piston 44 being indicated by the reference numeral 54 in FIG. 5.

The outer peripheral surface 49 of the piston 44 is disposed closely adjacent the internal peripheral surface 31 of the housing means 21 so as to tend to dampen vibration and chatter therebetween during the operation of the expansion device 20. For example, in one working embodiment of the expansion device 20 of this invention, the internal diameter that is defined by the surface 31 of the housing means 21 is approximately 0.460 of an inch while the outer diameter of the piston 44 that defines the external peripheral surface 49 thereof is approximately 0.4575 of an inch. Such one working embodiment of the piston 44 of this invention has the hemispherical section 50 defined by a radius of approximately 0.168 of an inch and the frusto-conical surface 52 of the piston 44 is disposed substantially at an angle of 45° to the longitudinal axis 54.

Such one working embodiment of the piston 44 of this invention can have different selected dimensions for the length and diameter of the passage 47 passing therethrough so that a plurality of pistons 44 can be provided and merely by selecting the one having the desired sized passage 47 therethrough will control the performance of the particular expansion device 20 using that selected piston 44 in a manner well known in the art.

For example, the passage 47 passing through the piston 44 can have a frusto-conical defining section 55 and a substantially straight section 56 with the frusto-conical section 55 having its larger end 57 interrupting the first end surface 45 and the straight section 56 interrupting the second end surface 46 as illustrated. In one working embodiment of the piston 44 of this invention that has the previous dimensions set forth, the straight section 56 has a length of approximately 0.1939 of an inch and a diameter of approximately 0.0420 of an inch while the larger base 57 of the frusto-conical section 55 has a diameter of approximately 0.0541 of an inch and the longitudinal length of the piston member is approximately 0.500 of an inch.

Of course, it is to be understood that the various dimensions previously set forth are merely examples of one working embodiment of one piston 44 of this invention and are not to be limitations on this invention.

The grooves 48 in the piston 44 are disposed in a spaced apart circular array as illustrated in the drawings and in the one working embodiment of the piston 44 of this invention previously set forth comprise five such grooves 48 each having a width of approximately 0.062 of an inch and having a first straight section 58 thereof that has a depth of approximately 0.062 of an inch and thereby only interrupts the frusto-conical annular section 51 of the first end face 45 and has a bottom 59 that is spaced outwardly from the smaller base 52 thereof as illustrated, the bottom 59 of each groove 48 being substantially flat even though the same may be described on a radius extending from the longitudinal axis 54 of the piston 44 so that the section 58 of each groove 49 has a substantially rectangular cross-sectional configuration throughout the length thereof.

Each groove 48 of the piston 44 has another straight section 60 that joins with the section 58 and interrupts the flat end surface 46 in such a manner that the bottom 61 of the section 60 is disposed at an angle relative to the longitudinal axis 54 and in the one working embodiment of the piston 44 previously set forth makes an angle of approximately 45° with the axis 54. Thus, it can be seen that the section 60 of each groove 48 also has a substantially rectangular cross-sectional configuration throughout the length thereof.

In this manner, when the piston 44 is disposed in the second position illustrated in FIG. 3, it can be seen that the annular shoulder 40 of the housing means 21 will not close off the grooves 48 so that a free flow of fluid is provided through the grooves 48 between the ports 22 and 23 as illustrated. Also, when the piston 44 is disposed in the first position illustrated in FIG. 2, it can be seen that the hemispherical section 50 of the piston 44 seals closed against the frusto-conical valve seat means 45 so that no fluid flow through the grooves 48 can be provided between the ports 23 and 22 so that the only fluid flow provided between the ports 23 and 22 is through the restricted passage 47 of the piston 44 for a purpose well known in the art.

As previously stated, the number of capillary tubes 26 which can be interconnected to the port 22 of the expansion device 20 can be any desired number within reason and the embodiment illustrated in FIGS. 1–6 has four capillary tubes 26. However, it can be seen in FIGS. 7 and 8 that a single capillary tube 26 can be provided and the same can be disposed in axially aligned relation with the longitudinal axis 54 of the piston member 44 as illustrated, if desired.

In any event, it can be seen that the housing members 27 and 41 can be formed of any suitable metallic material and the capillary tubes 26 can be secured in the respective openings 27' by silver soldering or the like when the capillary tubes 26 are formed of copper as is well known in the art.

It can be seen that the expansion device 20 is adapted to operate in such a manner that when the fluid flow is from the port 23 to the port 22, such fluid flow acts against the piston 44 to force the same to the position illustrated in FIG. 2 whereby the first end surface 45 of the piston 44 closes against the valve seat 30 so that all fluid flow from the port 23 to the port 22 and, thus, to the capillary tubes 26 is through the restricted passage 47 of the piston 44. However, when the fluid flow through the expansion device 20 is reversed so as to flow from the port 22 to the port 23, such fluid flow causes the piston 44 to move from the first position illustrated in FIG. 2 to its second position illustrated in FIG. 3 wherein the second end surface 46 is now disposed against the shoulder 40 of the housing means 21 and the fluid flow is now adapted to flow in a substantially unrestricted manner through the grooves 48 of the piston member 44 from the port 22 to the port 23.

It can be seen that the sliding movement of the piston 44 against the internal peripheral surface 31 of the housing means 21 is in a smooth manner because of the inherent low coefficient of friction of the polymeric material of the piston 44 acting on the smooth internal peripheral surface 31 of the housing means 21. In addition, because a relatively large surface is provided by the ungrooved portion of the external peripheral surface 49 of the piston 44 in contrast to the width of the grooves 48, a tendency of the piston 44 to vibrate and thereby chatter in the housing means 21 is substantially reduced over prior known arrangements.

Therefore, it can be seen that this invention not only provides a new expansion device for a refrigeration system and a new piston for such an expansion device, but also this invention provides a new method of making such an expansion device and a new method of making such a piston.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In an expansion device for a refrigeration system and comprising a housing means having opposed port means for coupling said device in said system and being separated from each other by an internal valve seat means of said housing means, and a movable piston disposed in said housing means and having a first end surface means adapted to engage against said valve seat means to tend to close the same when said piston is disposed in a first position thereof in said housing means, said housing means having an annular shoulder means, said piston having a second end surface means for engaging against said shoulder means when said piston is disposed in a second position thereof in said housing means, said piston having a passage means passing therethrough and through said end surface means thereof for interconnecting said opposed port means together in a restricted manner when said piston is in said first position thereof, said piston having an outer peripheral surface means interconnecting said end surface means together and being provided with a plurality of grooves therein for interconnecting said opposed port means together in a substantially nonrestricted manner when said piston is in said second position thereof, the improvement wherein said piston comprises a one-piece member of polymeric material and wherein said first end surface means of said piston comprises a substantially hemispherical section that is the part thereof that is adapted to engage said valve seat means when said piston is in said first position thereof, said grooves each interrupting said first end surface means and said second end surface means of said piston, said first end surface means of said piston comprising an outer annular section surrounding said hemispherical section, said outer section of said first end surface means of said piston being frusto-conical with the smaller base thereof joining said hemispherical section and the larger base thereof joining said outer peripheral surface means, said grooves interrupting only said outer annular section of said first end surface means of said piston, said grooves each having a bottom that is spaced outwardly from the larger base of said hemispherical section of said first end surface means of said piston at the point where the respective groove interrupts said outer annular section thereof, said second end surface means of said piston being substantially flat and being disposed substantially transverse to a longitudinal axis of said piston, said grooves each having a bottom surface that has two substantially straight sections one of which is disposed substantially parallel with the axis of said piston as said one section extends from said first end surface means to the other section which is angled toward said axis of said piston as said other section extends from said one section thereof to said second end surface means of said piston.

2. An expansion device as set forth in claim 1 wherein said grooves each has a substantially rectangular transverse cross-sectional configuration throughout the length thereof.

3. In a piston for an expansion device for a refrigeration system wherein the device has a housing means provided with opposed port means for coupling said device in said system and being separated from each other by an internal valve seat means of said housing means, said piston being adapted to be disposed in said housing means and have a first end surface means adapted to engage against said valve seat means to tend to close the same when said piston is disposed in a first position thereof in said housing means, said piston having a second end surface means adapted to engage against an annular shoulder means of said housing means when said piston is disposed in a second position thereof in said housing means, said piston having a passage means passing therethrough and through said end surface means thereof for interconnecting said opposed port means together in a restricted manner when said piston is in said first position thereof, said piston having an outer peripheral surface means interconnecting said end surface means together and being provided with a plurality of grooves therein for interconnecting said opposed port means together in a substantially nonrestricted manner when said piston is in said second position thereof, the improvement wherein said piston comprises a one-piece member of polymeric material and wherein said first end surface means of said piston comprises a substantially hemispherical section that is the part thereof that is adapted to engage said valve seat means when said piston is in said first position thereof, said grooves each interrupting said first end surface means and said second end surface means of said piston, said first end surface means of said piston comprising an outer annular section surrounding said hemispherical section, said outer section of said first end surface means of said piston being frusto-conical with the smaller base thereof joining said hemispherical section and the larger base thereof joining said outer peripheral surface means, said grooves interrupting only said outer annular section of said first end surface means of said piston, said grooves each having a bottom that is spaced outwardly from the larger base of said hemispherical section of said first end surface means of said piston at the point where the respective groove interrupts said outer annular section thereof, said second end surface means of said piston being substantially flat and being disposed substantially transverse to a longitudinal axis of said piston, said grooves each having a bottom surface that has two substantially straight sections one of which is disposed substantially parallel with the axis of said piston as said one section extends from said first end surface means to the other section which is angled toward said axis of said piston as said other section extends from said one section thereof to said second surface means of said piston.

4. A piston for an expansion device as set forth in claim 3 wherein said grooves each has a substantially rectangular transverse cross-sectional configuration throughout the length thereof.

* * * * *